Nov. 2, 1954 P. C. CLARKE ET AL 2,693,328
LOAD DECELERATOR FOR PARACHUTES
Filed July 12, 1951 6 Sheets-Sheet 1

INVENTORS.
PHILIP C. CLARKE
LEO B. GLASER
BY FRANK A. VOTTA, JR.

ATTORNEYS.

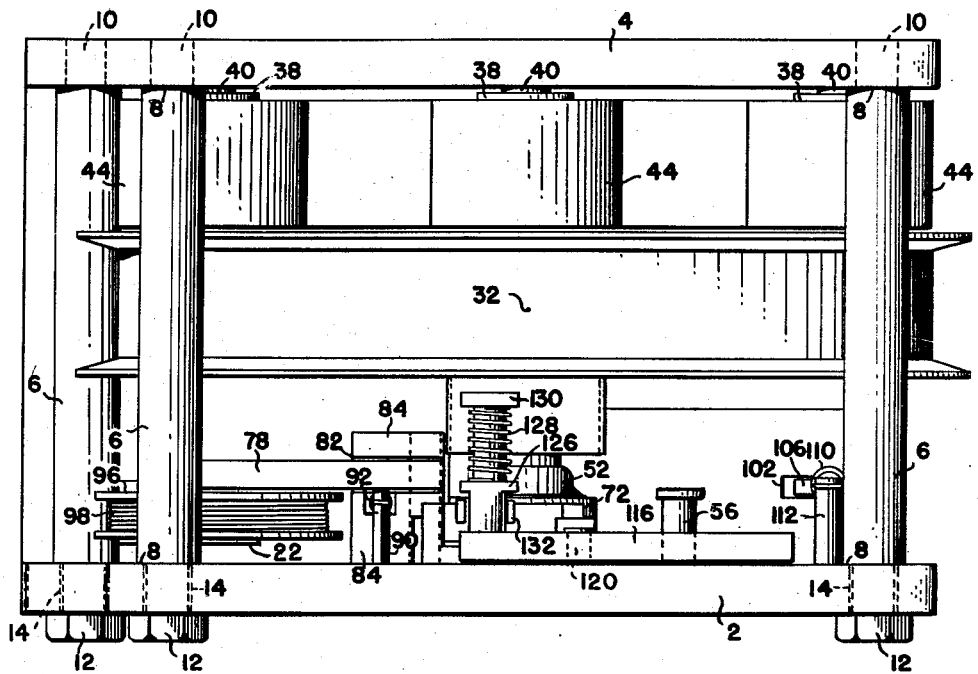
FIG. 3.
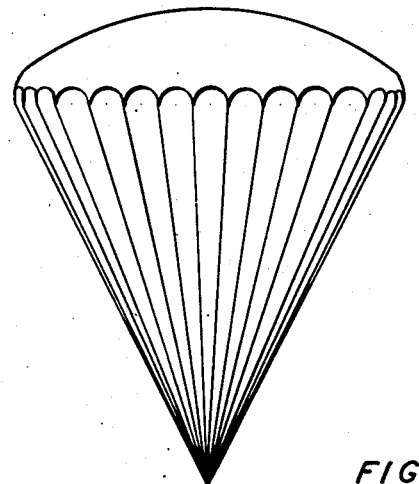
FIG. 4.
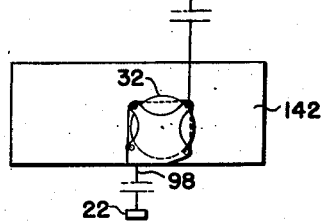
INVENTORS.
PHILIP C. CLARKE
LEO B. GLASER
FRANK A. VOTTA, JR.
ATTORNEYS.

Nov. 2, 1954 P. C. CLARKE ET AL 2,693,328
LOAD DECELERATOR FOR PARACHUTES
Filed July 12, 1951 6 Sheets-Sheet 4

INVENTORS.
PHILIP C. CLARKE
LEO B. GLASER
BY FRANK A. VOTTA, JR.

*Busser and Harding*
ATTORNEYS.

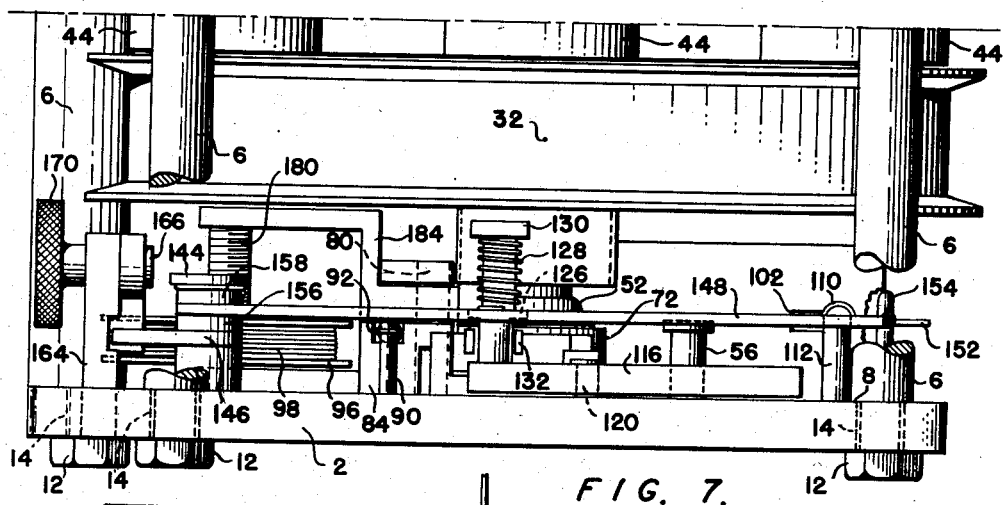
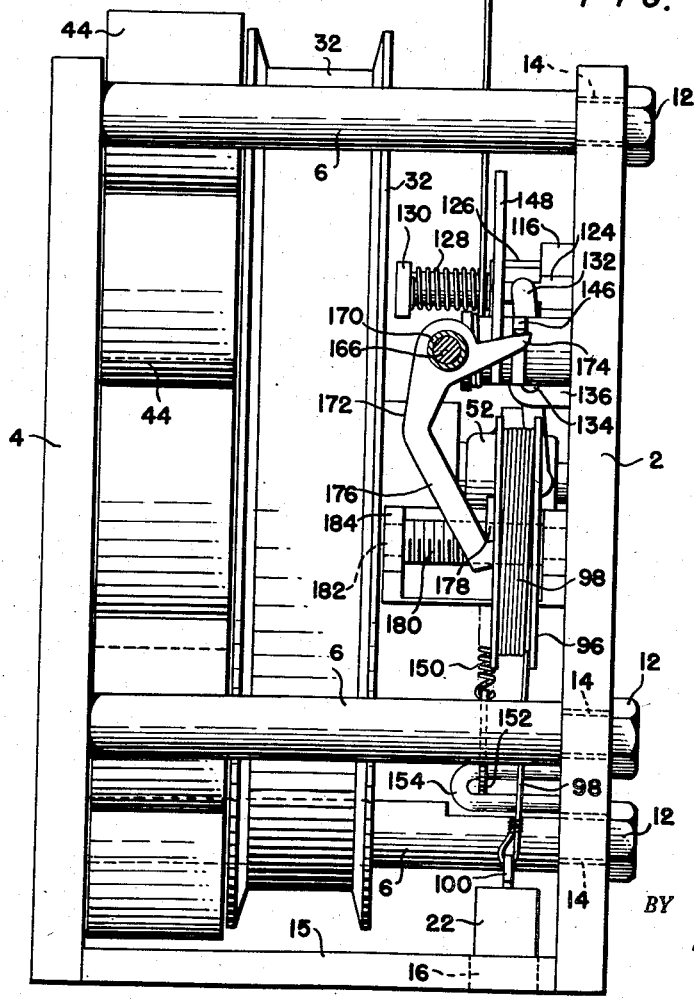

Nov. 2, 1954 P. C. CLARKE ET AL 2,693,328
LOAD DECELERATOR FOR PARACHUTES
Filed July 12, 1951 6 Sheets-Sheet 6

INVENTORS.
PHILIP C. CLARKE
LEO B. GLASER
FRANK A. VOTTA, JR.
BY
ATTORNEYS

United States Patent Office 2,693,328
Patented Nov. 2, 1954

2,693,328

LOAD DECELERATOR FOR PARACHUTES

Philip C. Clarke, Montgomery Township, Pa., Leo B. Glaser, Cranford, N. J., and Frank A. Votta, Jr., Ambler, Pa., assignors, by mesne assignments, to Eastern Metals Research Co., Inc., New York, N. Y., a corporation of New York Application July 12, 1951, Serial No. 236,334

7 Claims. (Cl. 244—138)

This invention relates to a load decelerating device for parachutes.

There is developing an ever increasing demand for the delivery of cargo from planes by the use of parachutes. The necessity for this is obvious when the time and landing facilities required by a plane to make delivery are considered in comparison with the ease of discharge of the cargo from a door or bomb bay. This is vital in military operations where supplies must be dropped regardless of the terrain or other conditions.

The principal limitation in parachute dropping of material is the effect of impact with the earth. Since impact is a function of the striking velocity, the permissible rate of descent of the suspended load is very sharply curtailed. Further, impact absorbing packaging must be devised and used in order to insure delicate or breakable equipment or supplies arriving in usable condition. This additional packaging involves expense and reduces the carrying capacity of both the plane and the chute. Currently the only means being used to reduce the striking velocity and hence the impact is to reduce the velocity of descent for the full distance. This means large chutes at higher cost and expensive packing which wastes cargo space of the plane.

Only the material which is landed in usable condition and within the area of usability is of any value. Recently much material has been lost due to the fact that it is impossible to accurately judge the amount of drift taking place with slow descent. Therefore, chute size should be reduced to improve accuracy but this results in a higher velocity and develops impact difficulties. The only answer to these combined problems, where high velocity is required for accuracy and cannot be tolerated because of impact, is to reduce the elevation at which the drop is made. Reduction of elevation involves greatly increased jeopardy to the plane due to bringing it within close range of enemy fire. Since the value of the plane and crew is extremely high, this is a very costly method when related to the value of the cargo being dropped. Despite this discrepancy in relative value the very existence of personnel is many times dependent upon receipt of the cargo in usable condition and the risk is taken.

This complex problem and the desirability of having high velocity drops coupled with low landing velocity has been long recognized. Various means have been tried which fall generally into classes as follows:

1. Explosive charges have been used reacting against the earth's surface, or within the canopy to increase momentarily the upward pressures. Both these methods involve sensing approach to the ground and then firing a charge. The objections are generally as follows: (a) Storage and handling of an explosive charge with detonating means is considered unsafe and very undesirable. (b) The uncertainty of the firing at the proper time. (c) The energy delivered is in most cases not uniform and is of a very short duration. (d) The energy cannot usually be made effective over a very long range to achieve good acceleration. (e) Explosives generally react differently at different temperatures and are particularly less effective when severely chilled.

2. Compressed air or gas. This means would offer a reasonable energy storage capacity except that loss of pressure is extreme at low temperature. It also has the deficiency of the former one in that the load delivered is not uniform and is usually limited to an extremely short stroke.

It is, broadly, the object of this invention to provide means for minimizing the impact against the ground of a parachute suspended load.

It is an additional object of this invention to provide a load decelerating device for parachutes in which the decelerating mechanism ceases to function when the load strikes the ground.

It is an additional object of this invention to provide a load decelerating device for parachutes which does not require the use of an expendable explosive charge or compressed gas cylinder of any kind to actuate the winding means.

It is an additional object of this invention to utilize the energy generated when the parachute opens to absorb the impact energy when the load strikes the ground.

It is a further object of this invention to provide a load decelerating device for parachutes in which any degree of impact energy absorption may be obtained by making minor structural changes in the device.

It is a further object of this invention to provide a load decelerator for parachutes which may be used with parachutes of the type commonly in use at the present time.

It is a further object of this invention to provide a load decelerator for parachutes which has a high degree of structural strength and requires no special hitch in order to attach it to the load or the parachute.

One embodiment of the invention is illustrated by the accompanying drawings, in which:

Figure 3 is a top view of the device of Figure 1.

Figure 4 is a schematic showing of the device of Figure 1 attached to a load and a parachute as it appears just before the load strikes the ground.

Figure 6 is a view of the left side of the device of Figure 5 showing the modified construction.

Figure 7 is a top view of the device of Figure 6 showing the modified construction.

Figure 1:
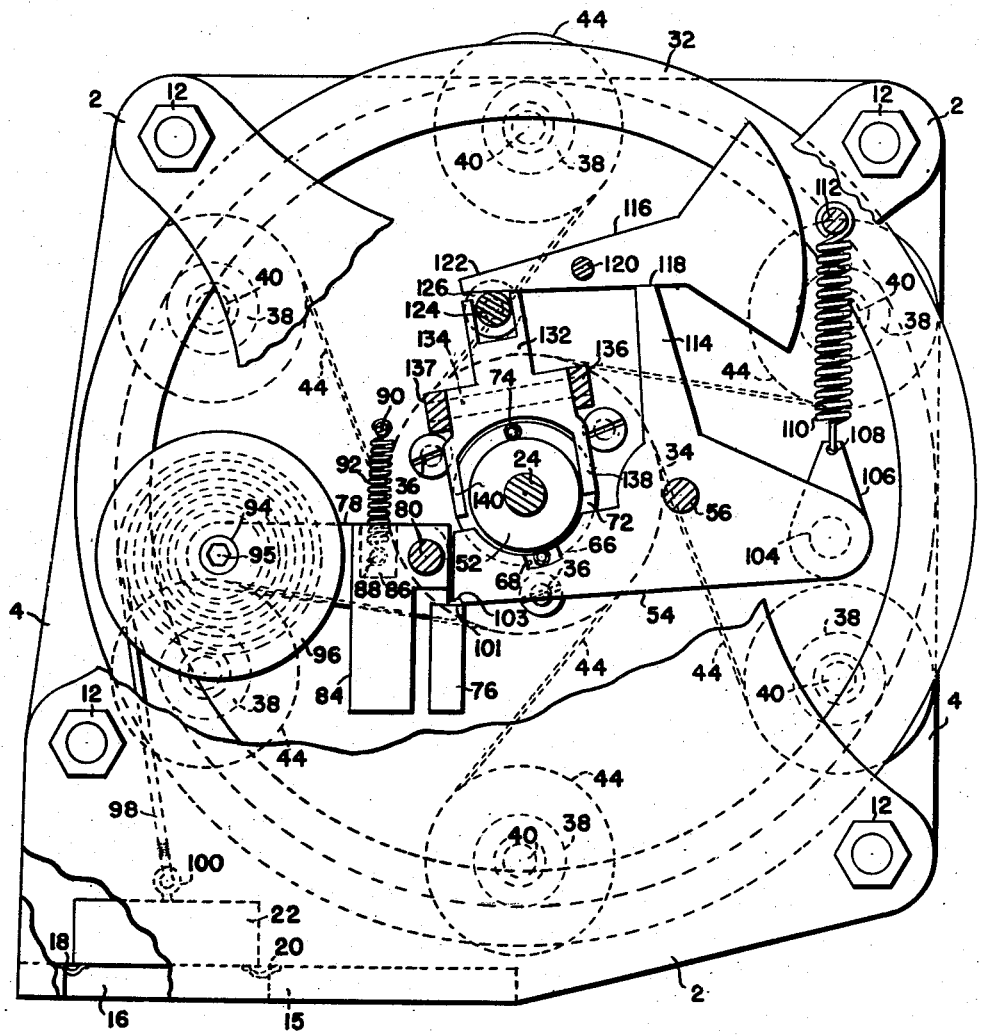
Figure 1 is a front view of the load decelerating device showing the face plate partly broken away.

The device consists of a housing composed of front plate 2 and back plate 4 joined by a plurality of machine studs 6 having shoulders 8 abutting against front plate 2 and back plate 4 and being threaded into the back plate 4 as indicated at 10. A plurality of nuts 12 are threaded onto the ends of the shoulder studs 6 where the studs project through openings 14 in the front plate 2. A plate 15 is provided in the lower left-hand side of the device as viewed in Figure 1 and extends between front and back plates 2 and 4 and is approximately one-half the width of the device as viewed in Figure 1. Plate 15 may be joined to the front and back plates by any suitable means, such as welding. Plate 15 has a rectangular shaped opening 16 therein having a pair of leaf springs 18 and 20 mounted at either side thereof to support a weight 22, the purpose of which will be hereinafter described. Shaft 24 is mounted between plates 2 and 4 and may be secured thereto by press fittting the shaft in openings in plates 2 and 4 or by keying or splining the shaft to said plates.

Mounted on shaft 24 are two bearing collars 26 and 28 which support sleeve 30 for rotation on shaft 24. Fixedly secured to sleeve 30, as by keying, splining or welding, or any other convenient means, is a reel 32 which is adapted to have a cable or other securing means to a parachute wound thereon. Secured to reel 32 is a drum 34, said drum being secured to reel 32 by means of headed machine bolts 36.

Secured to back plate 4 are a plurality of spring motors of the type employing pre-stressed, tightly wound, self-coiling springs having a plurality of reels 38 mounted for rotation on headed machine bolts 40 which are threaded into back plate 4 as indicated at 42. Each reel 38 has a pre-stressed, tightly wound, self-coiling spring 44 wound thereon, the free end of each spring being backwound on drum 34. The springs are of the type disclosed in U. S. Patent 1,977,546, granted to Axel F. Fornelius.

The spring motors employed in this invention are of the conventional type similar to that disclosed in U. S. Patent 2,063,799, granted to Axel F. Fornelius et al. and consist of a plurality of pre-stressed springs, each of which is tightly wound on a reel.

Sleeve 30 has a shoulder portion 46 which abuts against the hub of the reel 32. The left-hand end of sleeve 30, as viewed in Figure 2, has a recessed portion 48 which receives the splined shaft 50 of brake 52. The splines on brake shaft 50 engage corresponding splines in the recessed portion of sleeve 30. Brake 52 is of the conventional disc type which is well known in the art.

Referring now to Figure 1, it will be seen that lever 54 is slidably and rotatably mounted on pin 56, said pin being affixed to front plate 2 by any convenient means, such as press fitting in an opening in plate 2 or by welding. As will be seen from Figure 2, lever 54 is made in two parts 58 and 60 which may be joined together by welding. Part 60 is threaded on its upper side as indicated at 62, said threads cooperating with corresponding threads 64 on the sleeve 30. Portion 58 of lever 54 has a shoulder 66 extending above the surface of the portion 60 of the lever 54 and having a cut-out portion thereon as indicated at 68 in order that spring 70 may pass therethrough. Spring 70 is attached to front plate 2 by any convenient means and is attached to actuating collar 72 of brake 52 at its other end. A spring 74 is provided 180° around the periphery of actuating collar 72 and is also attached to front plate 2 and actuating collar 72 by any convenient means. Mounted below the left part of lever 54, as viewed in Figure 1, is a rest or limit stop 76 which serves to support lever 54 when it is positioned to the left as viewed in Figure 2.

Referring again to Figure 1, lever 78 is mounted on pin 80 and is adapted to move with a reciprocating motion in slot 82 in block 84. Block 84 is fixedly mounted on pin 80 and is secured to front plate 2 by welding or other convenient means, and has a well 86 formed therein to accommodate pin 88, which is affixed to lever 78. Pin 90 is fixedly secured to front plate 2 by welding or other convenient means and is mounted directly above pin 88. Mounted between pins 88 and 90 is coil spring 92 which serves to bias lever 78 in an upward direction. Passing through lever 78 and being mounted for rotation therein is a shaft 94 having a hexagonal well 95 in the end thereof to receive the end of a crank, which is not shown, for rewinding reel 96, for a purpose to be hereinafter described. Reel 96 is mounted on shaft 94 and rotates therewith. Reel 96 has a length of light cable 98 wound thereon, one end of which is affixed to the reel, the other end being affixed to eye 100 which is, in turn, secured to weight 22. Sufficient friction between shaft 94 and lever 78 is provided, by means of a close fit or other convenient means, to prevent reel 96 from rotating due to the action of tension spring 92 which tends to bias lever 78 in an upward direction. At the opposite end of lever 78 is a projection 101 which engages in milled slot 103 formed in lever 54. Part 60 of lever 54 has a slot 102 formed therein which receives a pin 104 fixedly secured to part 60. Rotatably mounted on pin 104 is connecting link 106 having a hole 108 in its upper end to receive the end of spring 110, the other end of which is secured to pin 112, said pin being secured to front plate 2 by press fitting in an opening therein, or by welding or other convenient means. Thus it will be seen that spring 110 tends to bias pin 104 in an upward direction. Formed integral with lever 54 is an arm 114 which extends upwardly and engages counter-balanced lever 116 as shown at 118. Lever 116 is rotatably mounted on pin 120 which is fixedly secured in front plate 2. Lever 116 has an end portion 122 which rests on pin 124. Pin 124 is fixedly secured to front plate 2, as by press fitting in an opening in front plate 2 or by welding or other convenient means. Mounted on pin 124 is a collar 126 which abuts against compression spring 128, said spring being mounted between collar 126 and headed portion 130 of pin 124.

Figure 2:
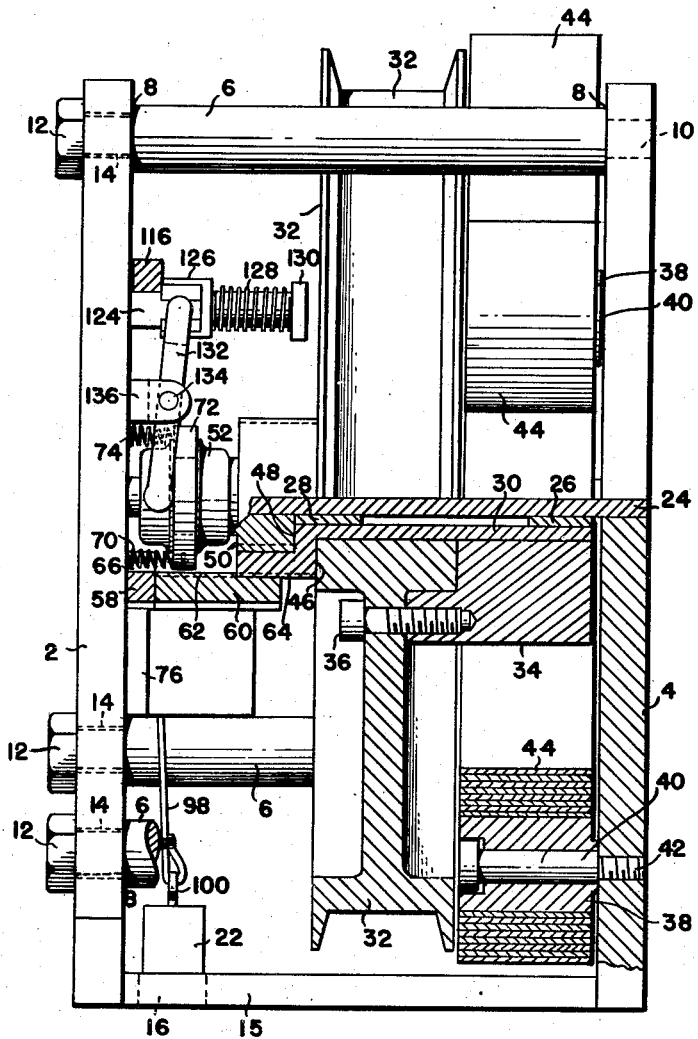
Figure 2 is a view of the right side of the device of Figure 1, partly broken away.

As best seen in Figure 2, collar 126 engages the bifurcated end 132 of a shifting yoke which is fulcrumed on pin 134, said pin being mounted on projections 136 and 137 extending from front plate 2. The opposite end of the shifting yoke is formed in two arms 138 and 140 which engage collar 72 on brake 52.

Referring specifically to Figure 4, the decelerator mechanism is shown as it appears when freely falling through the air and before weight 22 has reached the ground. As will be seen from Figure 4, the parachute may be connected by means of any conventional hitch to a line which is wound upon reel 32. The decelerator mechanism may be lashed to load 142 by any convenient means, said lashing means forming no part of the instant invention.

Figure 5:
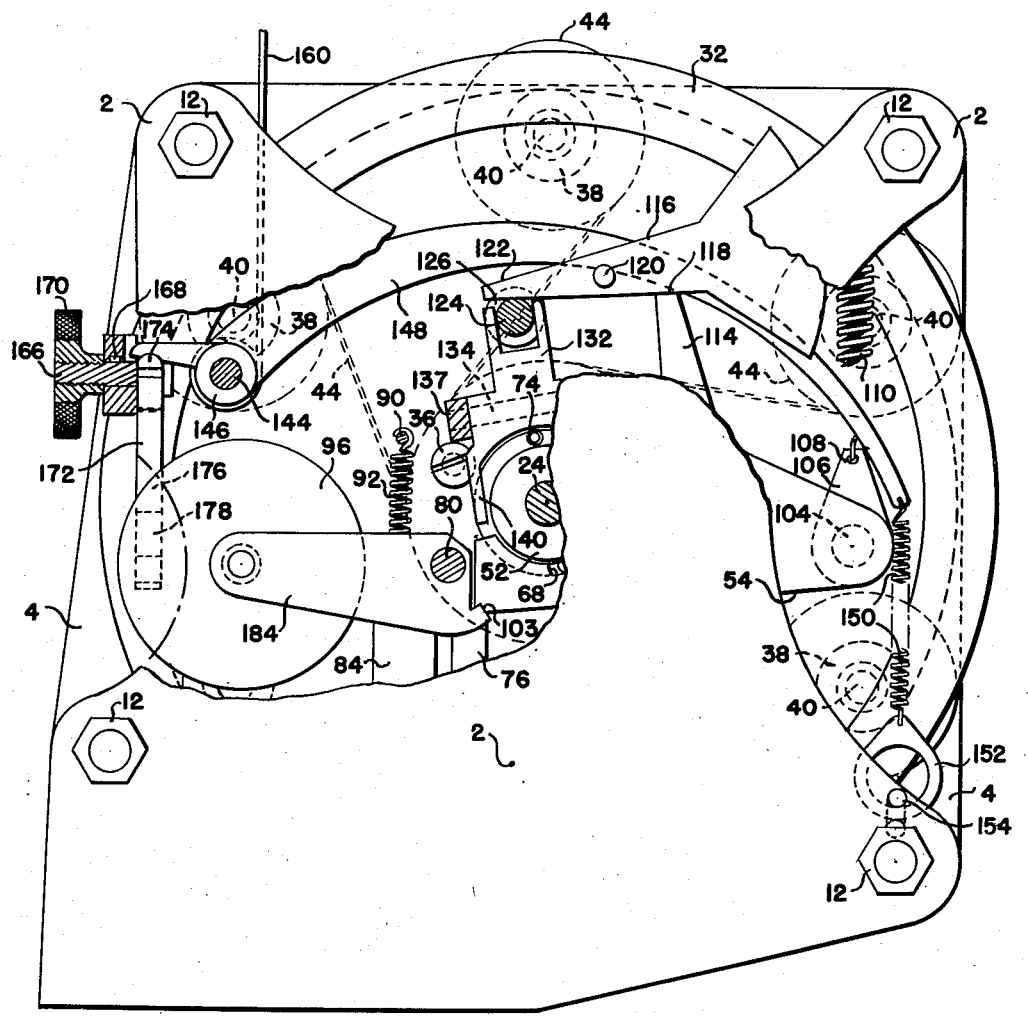
Figure 5 is a front view of a modified construction of the load decelerating device showing the face plate partly broken away.

Referring specifically to Figure 5, a modified construction of the decelerator mechanism is shown which provides for actuation of the motor by the sensing mechanism at a point above the ground determined by the weight of the load to which the decelerator mechanism is attached. In this construction, headed pin 144 is secured to face plate 2 by any convenient means such as welding. Rotatably mounted on pin 144 is arm 146 which is integral with arm 148. Arm 148 at its opposite end engages one end of tension spring 150, the other end of said spring 150 being secured to ring 152. Ring 152 is secured to front plate 2 by pin 154. Arms 146 and 148 are made integral with sleeves 156 and 158, the entire assembly being rotatably mounted on pin 144. Sleeve 158 has one end of cable 160 secured thereto.

As best shown in Figure 7, bracket 164 is secured to front plate 2 by any convenient means and has pin 166 projecting therethrough, said pin being threaded at its left-hand end, as viewed in Figure 5 and being keyed to bracket 164, as shown at 168. Threaded pin 166 has knurled hand wheel 170 mounted thereon. Rotatably mounted on pin 166 is lever 172 having arms 174 and 176, as shown in Figure 6. Lever arm 146 engages the top of lever arm 174, as shown in Figures 5, 6 and 7. Lever arm 176 at its lower end engages stop member 178 formed on reel 96. Reel 96 is formed with a threaded hub which engages corresponding threads 180 on shaft 182 with sufficient friction to prevent rotation of reel 96 due to the action of tension spring 92. Shaft 182 is fixedly secured to yoke member 184 by any convenient means. Yoke member 184 is rotatably supported by pin 80.

Figure 9:
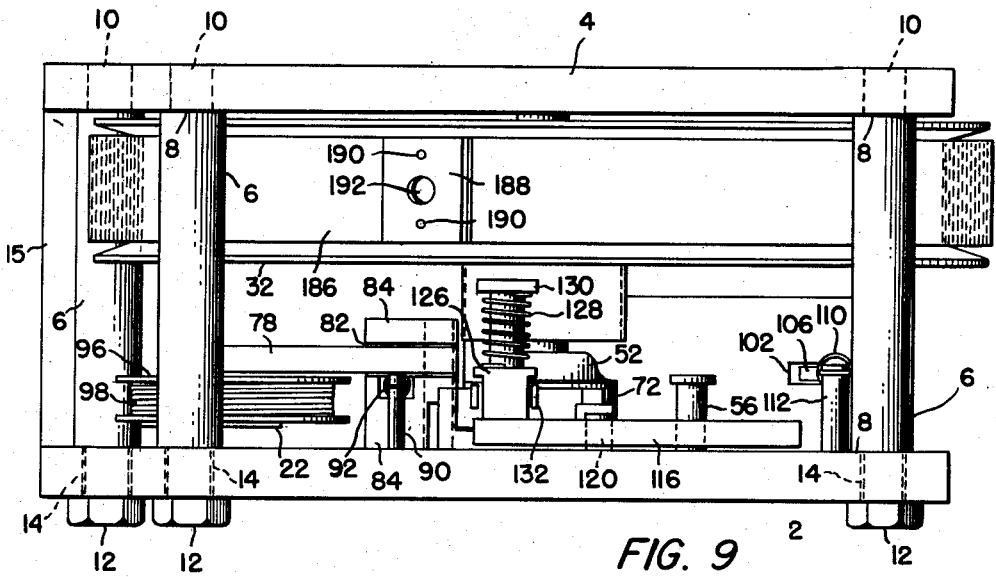
Figure 9 is a top view of a further modification of the invention.
Figure 10:
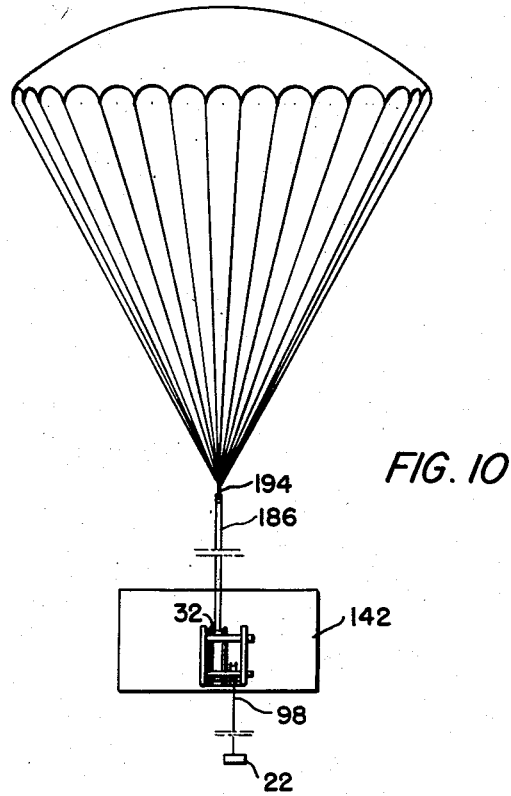
Figure 10 is a schematic showing of the device of Figure 9 attached to a load and a parachute as it appears just before the load strikes the ground.

Referring specifically to Figure 9, a further modification of the decelerator mechanism is shown in which a prestressed, tightly-wound, self-coiling spring 186 is mounted on reel 32 and has one end of spring 186 fixedly secured to said reel. The other end of the spring 186 is provided with a reinforcing strip 188 which is secured to said spring by rivets 190 or other convenient means. The reinforcing strip may be made of any desired material, such as steel plate, and is provided with an aperture 192, said aperture also extending through spring 186. The aperture 192 provides a convenient means for attaching spring 186 to a parachute, as shown in Figure 10, in which the spring 186 is shown attached to a ring 194, which is, in turn, secured to a parachute. The construction of this embodiment of the invention is the same as that shown in Figures 1, 2 and 3, with the exception that the springs 44 of the embodiment shown in Figures 1, 2 and 3 are replaced by the single spring 186 in Figure 9.

Figure 10 shows the device of Figure 9 attached to a load and a parachute as it appears just before the load strikes the ground. In this construction, it will be seen that the weight of the decelerator mechanism and the load 142 is supported by spring 186, which has one end secured to the parachute.

The operation of the device is as follows:

When the device is to be discharged from an aircraft, attached to either cargo or personnel, all parts are in the position as viewed in Figures 1, 2 and 3. The cable attached to the parachute will be tightly wound on reel 32. The device is then dropped from the aircraft attached to the load, and may be opened by any convenient means well known to the art after the requisite free-fall time has passed necessary for the parachute to clear the aircraft. As the parachute opens it will be appreciated that an impact occurs due to the filling of the parachute with air. This impact is sufficient to cause weight 22 to drop through opening 16 against weak springs 18 and 20 thereby causing cable 98 to unwind from reel 96. Cable 98 may be of any desired length depending upon the weight of the cargo or personnel and the calculated rate of descent. At the same time, the impact caused by the opening of the parachute causes reel 32 to rotate on shaft 24. Since reel 32 is firmly affixed to sleeve 30, sleeve 30 also rotates and in so doing, the threads 64 on shoulder portion 46 of sleeve 30 in cooperation with threads 62 on portion 60 of lever 54 cause lever 54 to move to the right as viewed in Figure 2. Lever 54 continues to move to the right and reel 32 continues to rotate until lever 54 has moved to the right a sufficient distance to cause it to move completely off of limit stop, or rest, 76 and until shoulder 66 abuts against brake collar 72. When shoulder portion 66 of lever 54 engages brake collar 72 the brake is applied and stops the rotation of reel 32. This rotation of reel 32 serves to energize self-coiling springs 44 due to the rotation of hub 34 which is attached to reel 32. Thus it is seen that the opening impact of the parachute serves to unwind cable 98, move lever 54 to the right as viewed in Figure 2, apply brake 52 by the action of portion 66 of lever 54 engaging said brake and also serves to energize self-coiling springs 44. Alternatively, it will be appreciated that self-coiling springs 44 may be energized before the device is discharged from the aircraft. This may be effected by rotating reel 32 against the action of springs 44 by any convenient means such as a winch.

With the parts of the device in this position, which position they will occupy during the time after the parachute opens and before weight 22 strikes the ground, it will be seen that self-coiling springs 44 are all exerting a torque on drum 34 which is opposed by brake 52.

As the load, having the decelerator device attached thereto, descends, weight 22 will strike the ground first since it is hanging below the load on cable 98. When weight 22 reaches the ground, lever 78 pivots about pin 80 due to the action of spring 92 since spring 92 is not opposed by weight 22 when weight 22 reaches the ground. As lever 78 pivots upwardly on pin 80 as viewed in Figure 1, projection 101 is disengaged from milled slot 103 in lever 54. Lever 54 then pivots about pin 56 due to the action of spring 110 joined between pins 104 in the right-hand end of lever 54 as viewed in Figure 1 and pin 112 which is affixed to the front plate 2. Thus, as lever 54 pivots in a counterclockwise direction, shoulder 66 of lever 54 drops out of engagement with brake collar 72 thereby releasing the brake. Since the brake is now released, reel 32 begins to rotate due to the torque exerted thereon by springs 44 wound on drum 34. The rotation of reel 32 serves to wind up the cable attached to the parachute, thereby decreasing the rate of descent of the load and increasing the rate of descent of the parachute.

Referring to Figure 1, it will be appreciated that as lever 54 rotates in a counterclockwise direction on pin 56 due to the action of spring 110, integral arm 114 moves out of engagement with counterweighted lever 116. Thus when the load strikes the ground the impact is sufficient to cause counterweighted lever 116 to rotate in a clockwise direction as viewed in Figure 1, thus removing end 122 of counterweighted lever 116 from engagement with pin 124 and shifting collar 126 mounted on pin 124. When end 122 of lever 116 is thus removed from engagement with the shifting collar 126, compression spring 128 biases shifting collar 126 toward the left as viewed in Figure 2, thereby moving ends 138 and 140 of the shifting yoke to the right as viewed in Figure 2 and applying brake 52 which serves to stop the rotation of reel 32. This latter operation is necessary in order to prevent the continued rotation of reel 32 once the load has reached the ground.

In order to re-use the device all that is necessary is that a crank or other convenient means be inserted in hexagonal well 95 and shaft 94 to rewind cable 98 or reel 96 and weight 22 is then supported on springs 18 and 20. Counterweighted lever 116 is again caused to rest on pin 124 by moving shifting collar 126 to the right as viewed in Figure 2, against the action of compression spring 128. Lever 54 is moved upwardly so that threads 62 thereon engage corresponding threads 64 on sleeve 30 and it is also moved to the left to the position shown in Figure 2. Latching means 101 is then engaged in milled slot 103 in lever 54.

Figure 8:
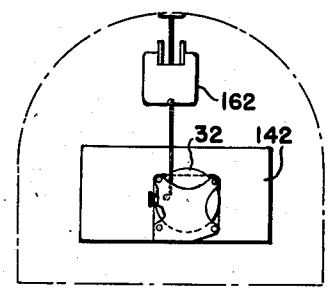
Figure 8 is a schematic showing of the device of Figure 5 shown suspended from a monorail in an aircraft.

The operation of the modified construction of Figures 5–8 is as follows:

When the device is to be discharged from an aircraft, the decelerator mechanism with the load attached thereto may be suspended from a monorail, such as that shown at 162 in Figure 8, by cable 160. Since cable 160 is attached to sleeve 158 rotatably mounted on pin 144, a force applied to cable 160 will tend to rotate sleeve 158 having lever arms 148, 146 and sleeve 156 formed integrally therewith in a counterclockwise direction as viewed in Figure 5 against the action of tension spring 150. It will be appreciated by those skilled in the art that the degree of rotation of sleeve 158 and members 148, 146 and 156 may be varied by changing the ratio of the tension spring 150 to the cable. In other words, the degree of rotation will be inversely proportional to the strength of spring 150. The rotation of lever arm 146 serves to depress lever arm 174 of lever 172, thus causing lever arm 176 of lever 172 to move to the left as viewed in Figure 6. Lever 172 may then be locked in position by turning knurled hand wheel 170 on threaded pin 166. The friction in this locking mechanism will hold lever 172 in a depressed position.

When lever arm 176 of lever 172 moves to the left as viewed in Figure 6, it will be appreciated that reel 96 may also move to the left, as viewed in Figure 6, on threaded shaft 182, when reel 96 is rotated, since stop member 178 no longer engages lever arm 176.

With the parts in this position, the device is then discharged from an aircraft and it will be appreciated, as heretofore described, that the opening impact of the parachute will be sufficient to cause weight 22 to fall through aperture 16 in plate 15 against the action of weak springs 18 and 20. When this occurs, reel 96 will rotate and cable 98 will unwind therefrom until reel 96 has moved a sufficient distance to the left as viewed in Figure 6 on threaded shaft 182 so that stop member 178 contacts lever arm 176. When this occurs, the rotation of reel 96 is stopped and no more cable is unwound. The succeeding operation of the decelerator mechanism is the same as heretofore described.

Thus it is apparent that the modified construction provides for varying the length of the cable 98 attached to weight 22 in proportion to the load to which the decelerator mechanism is attached. This results from the fact that lever arm 176 is moved to the left, as viewed in Figure 6, in proportion to the weight of the load to which the decelerator mechanism is attached. A greater load will move lever arm 176 a greater distance to the left as viewed in Figure 6, thus providing for more revolutions of reel 96 before stop member 178 contacts lever arm 176. The greater the number of revolutions of reel 96, the greater will be the length of cable 98 which depends below the decelerator mechanism.

It is, of course, desirable to have weight 22 depend a greater distance below the decelerator mechanism when a heavy load is dropped since the speed of descent of the load will be greater with the heavy load than with a light one. The greater length of cable serves to actuate the decelerator mechanism at a greater distance from the ground, thus compensating for the increased rate of descent.

It will be appreciated that the sensing mechanism could be preset by other means than by suspending from a monorail in an aircraft. For example, it could be suspended from any convenient means or it could be set by applying a force from any source to cable 160.

The operation of the modified construction of Figures 9 and 10 is similar to that of the embodiment of Figures 1–3. For instance, if the device is discharged from an aircraft in a manner similar to that employed with the embodiment of Figures 1–3, the opening impact of the parachute will cause reel 32 to rotate on shaft 24, thereby causing spring 186 to unwind. The further operation of this embodiment is the same as that of Figures 1–3, with the exception that the deceleration of the load is caused by spring 186 rather than by springs 44 of the embodiment shown in Figures 1–3.

From the foregoing description, it is obvious that the decelerator mechanism disclosed is extremely simple in operation and has a high degree of structural strength. The device can be used to decelerate any type of load whether it be personnel or cargo. For very heavy loads, it may be necessary in some cases to change the overall size of the device, making all parts larger for increased structural strength. However, in this case, the arrangement of elements and operation thereof remains the same.

By means of the self-coiling springs, a relatively high energy storage capacity to weight ratio is developed and the stored energy can be delivered at constant force over practically any deflection. Since the total energy stored (and used at constant force) becomes a function of deflection, the device based on this principle can have a wide range of application by a simple change in the distance from the ground at which the release of stored energy is effected. This invention therefore offers a means of meeting a wide variety of conditions in the field wherein it is only necessary to know the load-chute area relationship to determine how far from the ground sensing shall take place. Since constant force means constant acceleration, it is necessary only to arrange for the required deflection to fit any set of conditions and then to adjust the sensing time in order to make the equipment suitable for various loads.

By correlating the extension of the sensing means with the deflection of the spring means, it is possible, if desired, to have the load contact the ground with zero velocity, due to the fact that the constant force exerted by the spring provides constant acceleration of the load towards the parachute.

The scope of the presnt invention is to be restricted only in accordance with the appended claims.

What is claimed is:

1. A load decelerator for parachutes adapted to reduce the length of a riser between a parachute and a load which comprises a support, a shaft mounted in said support, a reel rotatably mounted on said shaft, motor means in operative engagement with said reel, means to actuate the motor means at a predetermined point above the ground and means responsive to shock of the load against the ground to stop the operation of the motor means.

2. A load decelerator for parachutes adapted to reduce the length of a riser between a parachute and a load which comprises a support, a shaft mounted in said support, a reel rotatably mounted on said shaft, a plurality of spring motors connected to said reel and biasing the reel for rotation in a direction to wind said rise on said reel; each motor including a tightly coiled strip of spring metal, said strip being pre-stressed to render it self-coiling and having an outer free end operatively connected to said reel, and means to support said coil for free rotation; means to actuate the motors at a predetermined point above the ground, and means to stop the operation of the motors when the load reaches the ground.

3. A load decelerator for parachutes adapted to reduce the length of a riser between a parachute and a load which comprises a support, a shaft mounted in said support, a sleeve rotatably mounted on said shaft, a reel mounted on said sleeve, spring means in operative engagement with said reel and adapted to rotate said reel, means to actuate said spring means at a predetermined point above the ground, and brake means to stop the rotation of said reel when the load reaches the ground.

4. A load decelerator for parachutes comprising a frame to be attached to a load, a member movable relative to and mounted in said frame to be connected to a parachute, said member being capable of extended movement relative to said frame to displace the frame relative to the parachute through an extended distance; a plurality of spring motors mounted in said frame, each motor including a tightly wound coil of a strip of spring metal having an outer free end, said strip being stressed to render it self-coiling, means in said frame supporting said coiled strip for rotation relative to said frame and means operatively connecting said free end to said member; latching means to hold said member in a position relative to said frame in which said strips are at least partially uncoiled and urge said member in a direction to move said frame by reaction toward said parachute, and means to release said latching means.

5. The load decelerator set forth in claim 4 in which said member comprises a reel rotatably mounted in said frame and the means connecting said free ends of said springs to the member comprises a drum connected to said reel and to said free ends of said strip and around which the strips are wound by rotation of said reel in one direction relative to said frame to urge the reel to rotate in the opposite direction.

6. The load decelerator set forth in claim 4 in which the means to release the latching means comprises a reel mounted in said frame for rotation and bodily movement relative thereto, a flexible member wound on said reel, a weight on the end of said flexible member to rotate said reel and unwind the member from said reel, means responsive to the weight of said load for limiting the rotation of said reel in proportion to said load, and means responsive to the weight striking the ground for moving said reel bodily to release the latching means.

7. A load decelerator for parachutes adapted to reduce the length of a riser between a parachute and a load and decelerate the fall of the load, which comprises a support, a reel rotatably mounted in said support, spring motor means to rotate said reel in one direction to wind up the riser on the reel, means responsive to the weight of the load on the parachute for rotating the reel in the opposite direction to wind up said spring and extend said riser, and flexible sensing means adapted to extend below said support, means supporting said sensing means for extension and retraction, the supporting means being controlled by the weight of the load to extend said sensing means an amount approximately proportional to the weight of the load.

References Cited in the file of this patent

UNITED STATES PATENTS

| Number | Name | Date |
|---|---|---|
| 1,977,546 | Fornelius | Oct. 16, 1934 |
| 2,477,907 | Smith | Aug. 2, 1949 |

FOREIGN PATENTS

| Number | Country | Date |
|---|---|---|
| 389,007 | Great Britain | Mar. 9, 1933 |
| 50,270 | France | Oct. 24, 1939 |
| | (Addition to No. 836,052) | |
| 851,913 | France | Oct. 16, 1939 |